United States Patent

Uzuki et al.

Patent Number: 5,377,038
Date of Patent: Dec. 27, 1994

[54] SCANNING OPTICAL SYSTEM

[75] Inventors: Kazuo Uzuki, Yokohama; Shin Mogi, Kawasaki, both of Japan

[73] Assignee: Canon Kabushiki Kaisha, Tokyo, Japan

[21] Appl. No.: 813,495

[22] Filed: Dec. 26, 1991

[30] Foreign Application Priority Data

Dec. 29, 1990 [JP] Japan ................... 2-418434
Jan. 18, 1991 [JP] Japan ................... 3-19550

[51] Int. Cl.$^5$ .................. G02B 26/08; G02B 7/02
[52] U.S. Cl. ........................ 359/205; 359/711; 359/819
[58] Field of Search ............... 359/205, 206, 811, 819, 359/828, 830, 820, 711, 642; 346/108

[56] References Cited

U.S. PATENT DOCUMENTS 4,662,717 5/1987 Yamada et al. .................. 359/811
4,796,963 1/1989 Yoshimura ..................... 359/206

FOREIGN PATENT DOCUMENTS 60-144710  7/1985  Japan .
61-107309  5/1986  Japan ................... 359/819
61-249010 11/1986  Japan .
62-139133  6/1987  Japan .
63-48510   3/1988  Japan ................... 359/205
63-170612  7/1988  Japan .
63-210818  9/1988  Japan ................... 359/206
63-273821 11/1988  Japan .

*Primary Examiner*—Scott J. Sugarman
*Assistant Examiner*—James Phan
*Attorney, Agent, or Firm*—Fitzpatrick, Cella, Harper & Scinto

[57] ABSTRACT

A synthetic resin lens for an optical system of a scanning optical system includes a synthetic resin lens having a light guide hole for directing a light beam at a light curable adhesive formed at a mount area thereof.

18 Claims, 12 Drawing Sheets

SCANNING OPTICAL SYSTEM

BACKGROUND OF THE INVENTION

1. Field of the Invention

The present invention relates to a scanning optical system which is used in an information recording apparatus such as a laser beam printer.

2. Related Background Art

FIG. 1 shows a plan view of a scanning optical system of an information recording apparatus and FIG. 2 shows a sectional view thereof. A laser oscillator 2, a collimator lens 3 and a cylindrical lens 4 are secured to a side wall of an optical box 1 and a polygon mirror 5 is mounted therein. A spherical lens 6, a toric lens 7 and a reflection mirror 8 are sequentially arranged in a direction of outgoing light beam.

The laser beam emitted by the laser oscillator 2 passes through the collimator lens 3 and the cylindrical lens 4, is deflected by the polygon mirror 5, and it is $f\theta$-corrected by the spherical lens 6 and the toric lens 7, and a resulting scanning light beam is reflected by the reflection mirror 8 and directed to a photoconductor drum which is an information recording medium.

In the prior art scanning optical system, the spherical lens 6 and the toric lens 7 are made of glass and the glass lenses are secured to the optical box 1 by ultraviolet ray cured adhesive so that the curing of the adhesive is promoted by irradiating an ultraviolet ray through the lens.

Recently, lens made of synthetic resin are frequently used in order to improve the productivity of the lenses, reduce the weight, reduce the cost and improve the performance by non-spherical planes. A preferable material of the synthetic resin is polycarbonate resin in view of good optical characteristic, small change of dimension by humidity and physical strength.

However, polycarbonate resin has a lower ultraviolet ray transmission than that of glass and it has only one fourth or fifth of the glass transmission. When it is to be secured by the ultraviolet ray cured adhesive as it is in the prior art glass lens, the following problem is encountered. The ultraviolet ray irradiation time is long and the workability is low. The adhesive is not uniformly cured due to ununiform irradiation. If the intensity of the ultraviolet ray is too high, the polycarbonate resin is deteriorated by a photo-oxidization reaction.

SUMMARY OF THE INVENTION

It is an object of the present invention to eliminate the above-noted disadvantage peculiar to the prior art and to provide a highly reliable scanning optical system which permits short time bonding of a synthetic resin lens.

In order to achieve the above object, the scanning optical system of the present invention which uses the synthetic resin lens in the optical system has a hole to guide an adhesive curing promoting light ray formed in a mount of the synthetic resin lens.

In the scanning optical system of the present invention, a light ray for promoting the curing is directed through the guide hole when the lens is mounted so that the curing of the lens securing adhesive is promoted.

Further, in order to achieve the above object, the synthetic resin lens of the present invention for the laser scan of the scanning optical system is securely bonded to a fixed base of the scanning optical system by the ultraviolet ray cured adhesive and has an integrally molded thin mount which projects beyond an effective area of the lens.

In the synthetic resin lens of the present invention for the laser scan of the scanning optical system, the ultraviolet ray cured adhesive is applied to a rear surface or a front surface of the projecting mount, and the lens is positioned on the fixed base and the ultraviolet ray is irradiated normally to the thin planar portion. In this manner, the lens is securely bonded to the fixed base in a short time.

DETAILED DESCRIPTION OF THE PREFERRED EMBODIMENTS

The preferred embodiments of the present invention are now explained in detail with reference to the drawings. The like elements to that of the prior art are designated by the like numerals and the explanation thereof is omitted.

Figure 1:
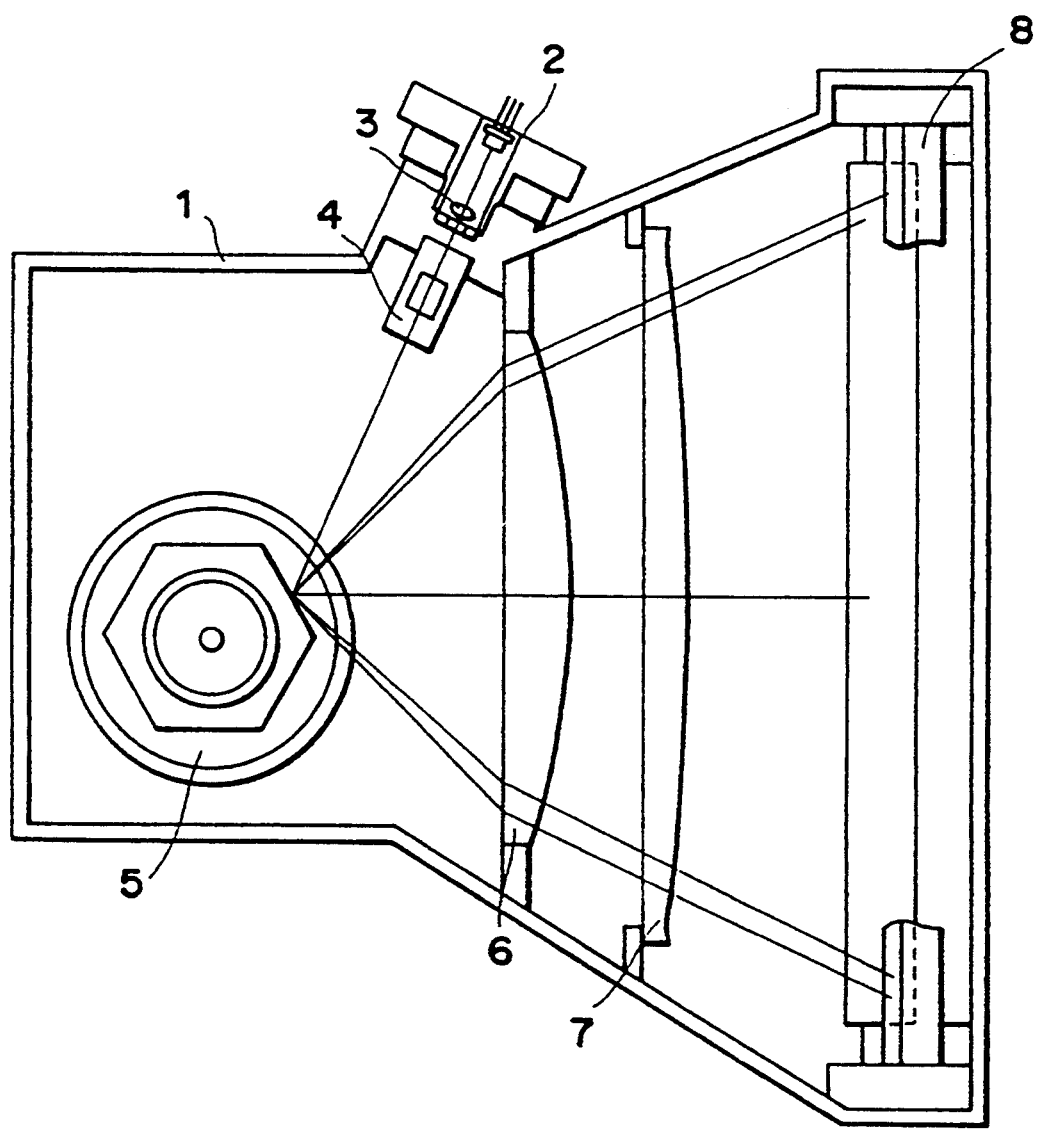
FIG. 1 shows a plan view of a prior art scanning optical system.
Figure 2:
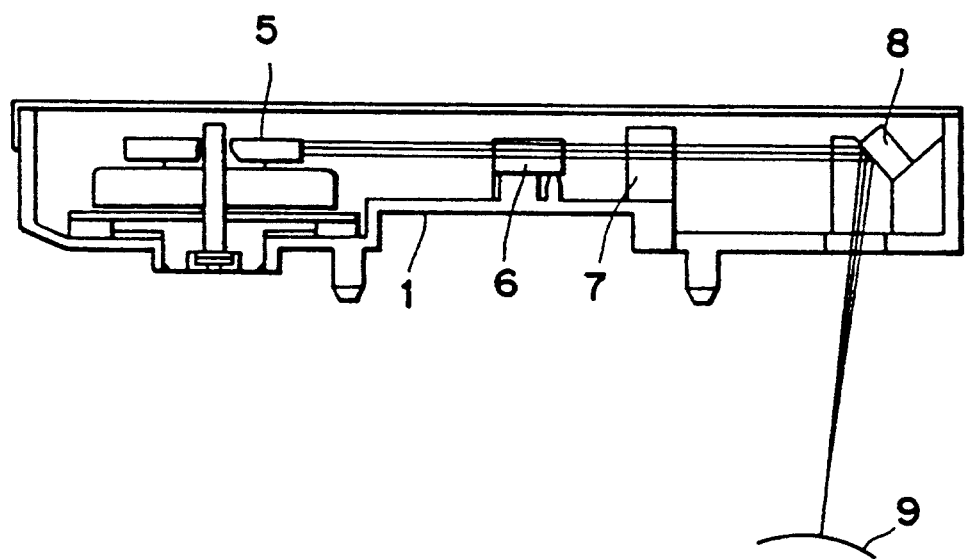
FIG. 2 shows a sectional view of the prior art scanning optical system.
Figure 3:
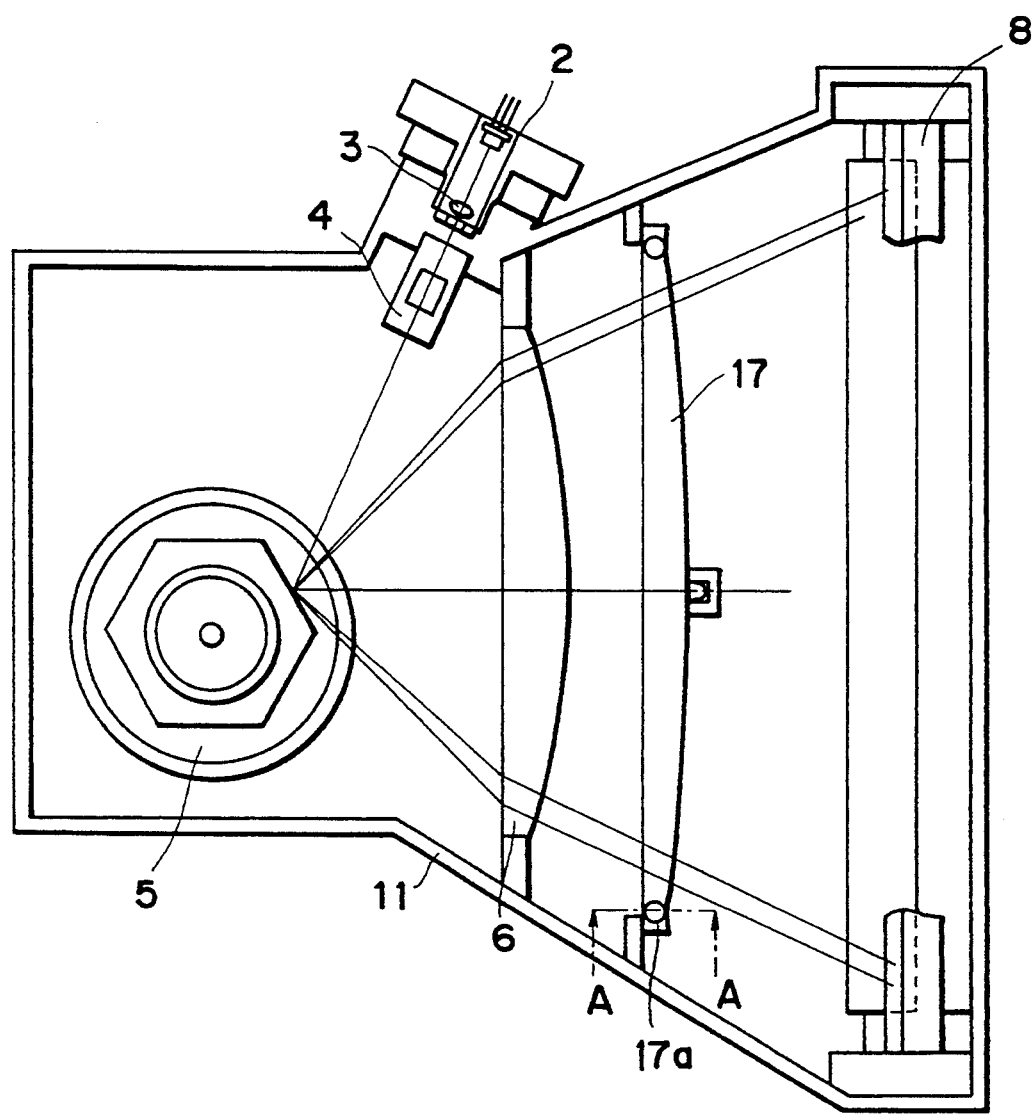
FIG. 3 shows a plan view of a first embodiment of a scanning optical system of the present invention.

FIG. 3 shows a plan view of the scanning optical system of the present invention. A laser oscillator 2 is inwardly mounted on a side wall of an optical box 11, and a collimator lens 3 and a cylindrical lens 4 are sequentially arranged on an optical axis of the laser oscillator 2, and a polygon mirror 5 is arranged on an extended line thereof. A spherical lens 6, a toric lens 17 and a reflection mirror 8 are sequentially arranged along a reflection path of the polygon mirror 5.

Figure 4:
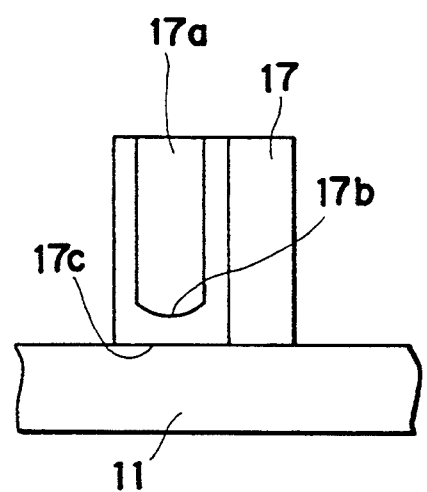
FIG. 4 shows an A—A sectional view of FIG. 3.

The toric lens 17 is made of polycarbonate resin, and it has cylindrical light guide holes 17a reaching from a top plane to a bottom plane formed beyond an effective area at right and left ends. As shown in FIG. 4, a concave lens plane 17b is formed at a bottom of the light guide hole 17a and it faces a mounting planar portion 17c which is a portion of the bottom of the toric lens 17.

To mount the toric lens 17 onto the optical box 11, a small amount of ultraviolet ray cured adhesive is dropped at a predetermined position on the optical box 11, that is, a mount position of the toric lens 17, the toric lens 17 is positioned so that the mounting planar portion 17c is put on the adhesive, and the ultraviolet ray is irradiated downward through the light guide hole 17a. The ultraviolet ray is enlarged by the concave lens plane 17b and irradiates the mounting planar portion 17c so that the curing is promoted.

The cylindrical guide holes 17a which reach the bottom plane 17c from the top plane are formed in the vicinity of the left and right ends beyond the effective area of the synthetic resin lens 17, and the ultraviolet ray cured adhesive is applied between the inner bottom plane of the optical box 11 and the bottom plane 17c, and the ultraviolet ray is irradiated downward through the guide holes 17a to secure the lens 17. While the ultraviolet ray goes through the synthetic resin from the bottom plane 17b of the guide hole 17a to the bottom plane 17c, it is not substantially attenuated because of a short length and irradiates the adhesive to cure it.

Figure 5:
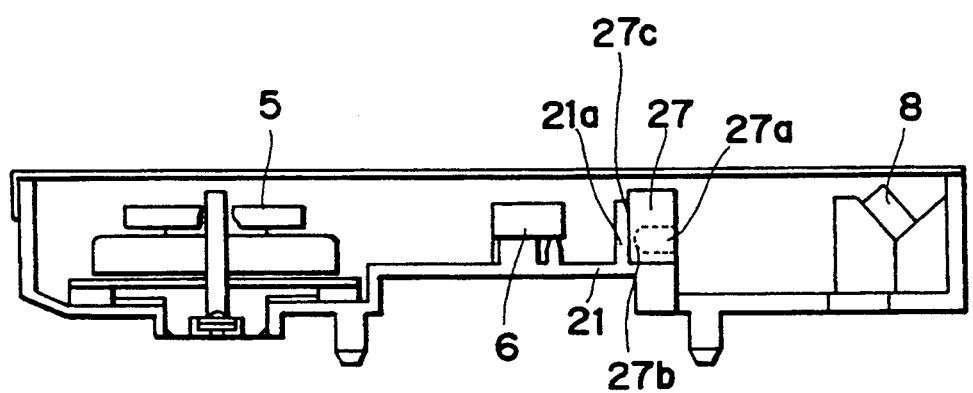
FIG. 5 shows a plan view of a second embodiment of the scanning optical system of the present invention.

FIG. 5 shows an inner side view of an optical box 21 of a second embodiment of the present invention. A toric lens 27 made of polycarbonate resin has cylindrical light guide holes 27a extending from a rear surface to a front surface parallely to an optical axis formed beyond an effective area of the toric lens 27 at right and left ends thereof. A bottom plane thereof is a concave lens plane 27b. Mounting planar portions 27c are formed at right and left ends of the rear surfaces of the light guide holes 27a, that is, the front surface of the toric lens 27, and they are bonded to a rear surface of a fixed part 21a which projects from the bottom of the optical box 21.

In the present embodiment, the toric lens 27 is abutted against the mounting planar portion 27c through the ultraviolet ray cured adhesive applied to the fixed part 21a, and the ultraviolet ray is directed horizontally through the light guide holes 27a.

Figure 6:
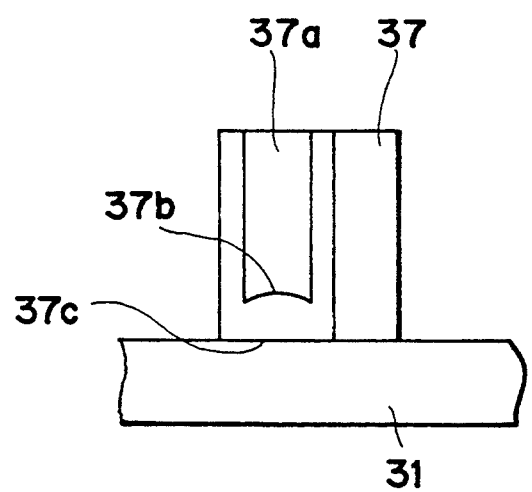
FIG. 6 shows a sectional view of a lens in a third embodiment of the scanning optical system of the present invention.

FIG. 6 shows a sectional view in the vicinity of a toric lens in a third embodiment of the present invention. A light guide hole 37a is vertically formed in a toric lens 37 as it is in the first embodiment, but a bottom plane of the toric lens 37 is a convex lens plane 37b so that an incident ultraviolet ray is focused to a mounting planar portion 37c of the toric lens 37.

Since the ultraviolet ray is focused by the convex lens plane 37b, exact and efficient radiation of the ultraviolet ray is attained even if the bonding area to the optical box 31 is small. The efficient radiation of the ultraviolet ray is attained by the lens action of the bottom of the hole.

In any of the above embodiments, since the light path length of the ultraviolet ray in the polycarbonate resin is shortened, the curing time of the adhesive is shortened and uncured area due to ununiform irradiation is hard to appear.

While the toric lens has been explained in the above embodiments, the present invention is also applicable to other synthetic resin lenses.

In the scanning optical system of the present invention, the light path length in the synthetic resin is reduced by the depth of the guide hole in the mount of the synthetic resin lens so that a stronger curing promoting light ray is irradiated to the bonding surface. Accordingly, the lens securing time is shortened and the reliability is improved.

Figure 7:
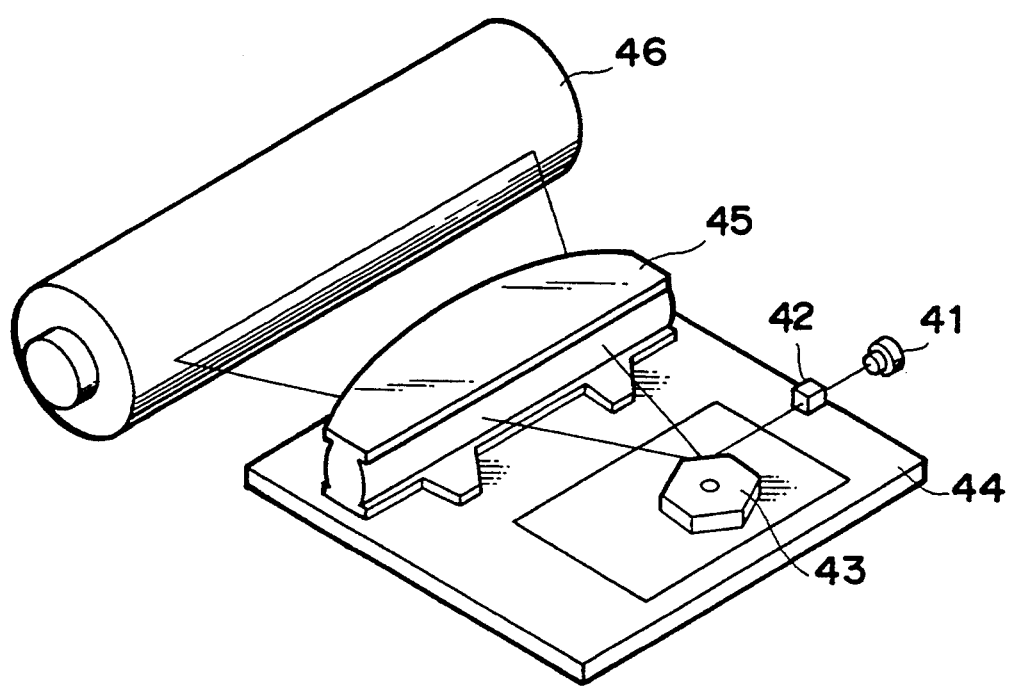
FIG. 7 shows a perspective view of a fourth embodiment of the scanning optical system of the present invention.

In a fourth embodiment of the scanning optical system for a laser beam printer of the present invention, as shown in FIG. 7, a light beam emitted from a laser unit 41 which comprises a laser light source and a collimate lens passes through a cylindrical lens 42, is deflected by a rotary polygon mirror 43 and is focused onto a photoconductor drum 46 by a scanning lens 45 including a toric lens secured to a fixed base 44.

A scanning synthetic resin lens to be explained later is used in the scanning optical system of the laser beam printer shown in FIG. 7.

Figure 8:
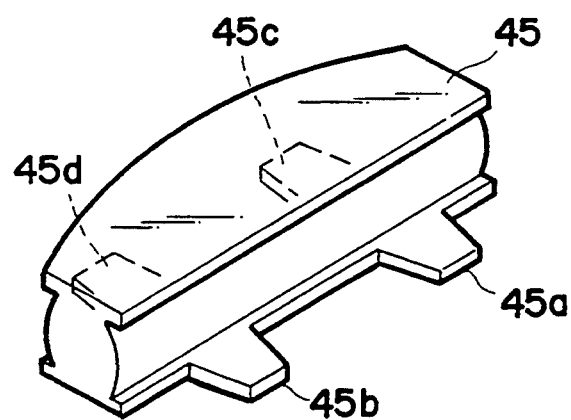
FIG. 8 shows a perspective view of a scanning synthetic resin lens of FIG. 7.
Figure 9:
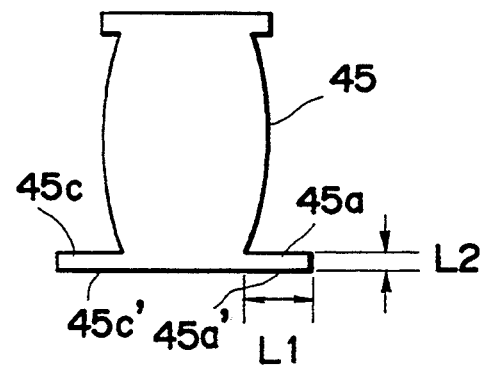
FIG. 9 shows a sectional view of the scanning synthetic resin lens of FIG. 7, FIGS. 10, 11 and 13 illustrate a method for securely bonding the scanning synthetic resin lens.

FIG. 8 shows a perspective view and FIG. 9 shows a sectional view. This mounts 45a~45d of tongue shape project at the opposite longitudinal ends of a thick scanning lens 45 below the effective area of the scanning lens 45.

Figure 10:
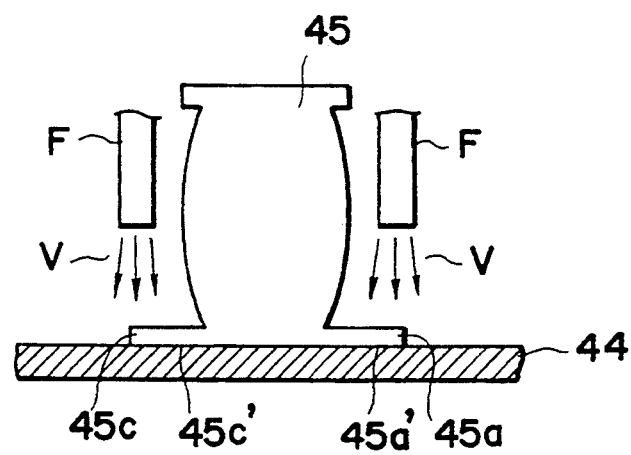

To securely bond the scanning lens 45 to a fixed base 44, adhesive is applied to adhesive application areas 45a'~45d' on the rear sides of mounts 45a~45d as shown in FIG. 10, the lens is positioned to the fixed base 44 and the ultraviolet ray V is irradiated from the above to the mounts 45a~45d through an optical fiber F.

When the ultraviolet ray cured adhesive is used, a mercury tube having a wavelength of approximately 357 nm, and a light power of approximately 200 W~1 KW is usually used as an ultraviolet light source. Thus, the transmission of the bonding material is less than 1% for the prior art scanning lens 45 having the thickness of approximately 13 mm and the irradiation time of approximately 1~2 minutes is required. In the scanning lens 45 of the present embodiment where the projection length of the mounts 45a~45d is L1=5 mm and the thickness is L2=2~3 mm, the ultraviolet ray transmission is approximately 20~30% and the securing of the adhesive is completed in several seconds. Thus, the irradiation time of the ultraviolet ray is materially shortened and the uneven irradiation of the ultraviolet ray is eliminated. The thickness L2 of the projection of the scanning lens 45 is preferably 1~5 mm. The mounting work is facilitated if the length L1 of the projection is longer than 1 mm, and preferably 3 mm or longer in order to improve the workability in the securing operation.

Figure 11:
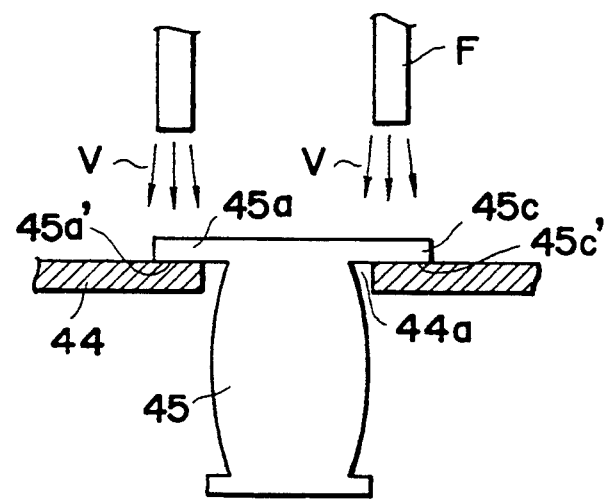

The scanning lens 45 may be secured by forming a hole 44a in the fixed base 44 and the adhesive is applied to adhesive application areas 45a'~45d' on the front surfaces of the mounts 45a~45d to bond the lens to the fixed base 44, as shown in FIG. 11. In this case, the ultraviolet ray V is irradiated from the rear side of the scanning lens 45 through the optical fiber F, and the same effect as that of the bonding method described above is attained. The position of the optical fiber F has a relatively large degree of freedom and the height of the scanning lens 45 may be reduced. Accordingly, this method is effective when an allowable height of the scanning lens 45 in the optical design is small.

Figure 12:
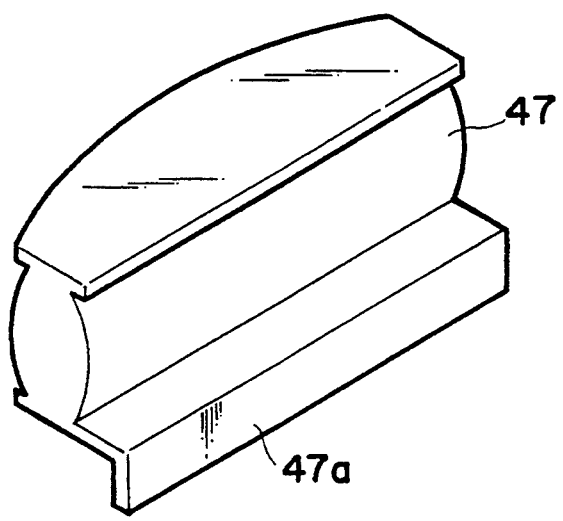
FIGS. 12, 14 and 15 show perspective views of the scanning synthetic resin lenses of the present invention.
Figure 13:
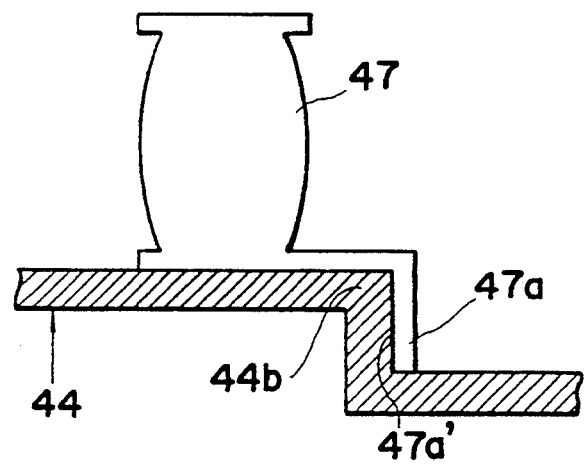

FIG. 12 shows a perspective view of a scanning lens 47 in other embodiment of the present invention. A thin mount 47a which extends horizontally and then vertically is formed integrally with the scanning lens 47 at the bottom of the scanning lens 47. When the scanning lens 47 is to be securely bonded to a fixed base 44, a step 44b which conforms to the contour of the mount 47a is formed on the fixed base 44 as shown in FIG. 13 and the lens is bonded by using the area of the mount 47a facing the step 44b as an adhesive application area 47a'.

The vertical positioning of the scanning lens 47 is attained without the adhesive by the formation of the mount 47a. It is effective when the allowable height of the scanning lens 47 in the optical design is small. The mount 47a may extend longitudinally of the scanning lens 47 as described above, or may partially extend longitudinally so long as a necessary area to securely bond the lens is assured.

Figure 14:
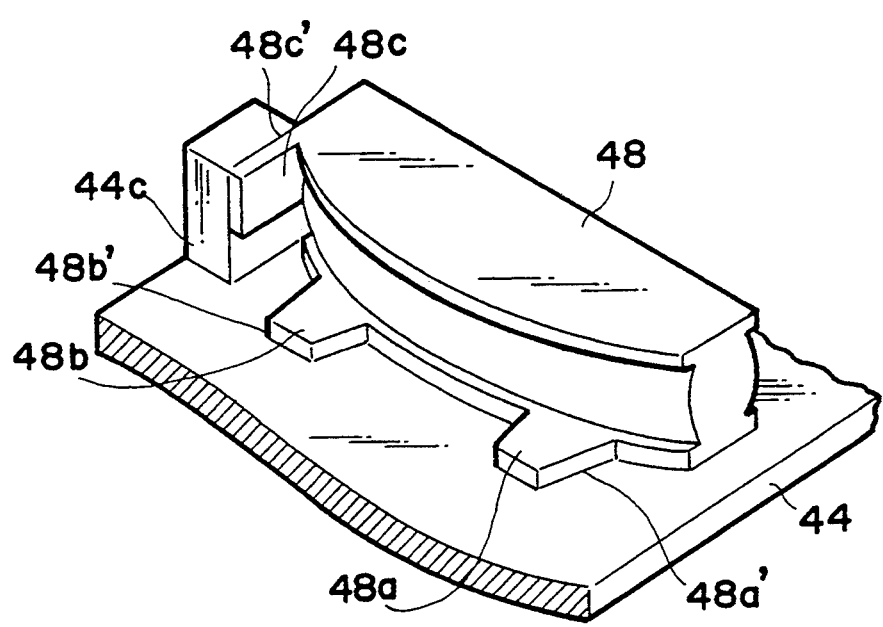

FIG. 14 shows a perspective view of a scanning lens 48 in other embodiment of the present invention. Two thin mounts 48a and 48b are formed integrally with the scanning lens 48 beyond the effective area of the lens to project at the longitudinally opposite ends. A thin mount 48c is also integrally formed in a side other than a bottom of the scanning lens 48 to project in a plane normal to the mounts 48a and 48b.

To securely bond the scanning lens 48 to the fixed base 44, a projection 44c which abuts against the mount 48c is formed in the fixed base 44 and the rear surfaces of the mounts 48a~48c are used as the adhesive application areas 48a'~48c'. The positioning precision and the reliability to the bonding strength are improved by forming the mount 48c on the side plane in addition to the bottom of the scanning lens 48.

The laser scanning synthetic resin lens of the present invention has the integrally molded thin mounts which extend beyond the effective area of the lens. The ultraviolet ray cured adhesive is applied to the rear surface or the front surface of the mount, and the lens is positioned to the fixed base, and the ultraviolet ray is irradiated normally to the thin plane. In this manner, the bonding is completed in a short time, the number of steps is reduced and the cost is reduced. Since the mount projects, the adhesive is evenly cured and the bonding distortion after the curing does not affect to the lens effective transmissive area. Thus, the deterioration of the optical characteristic is prevented.

Figure 15:
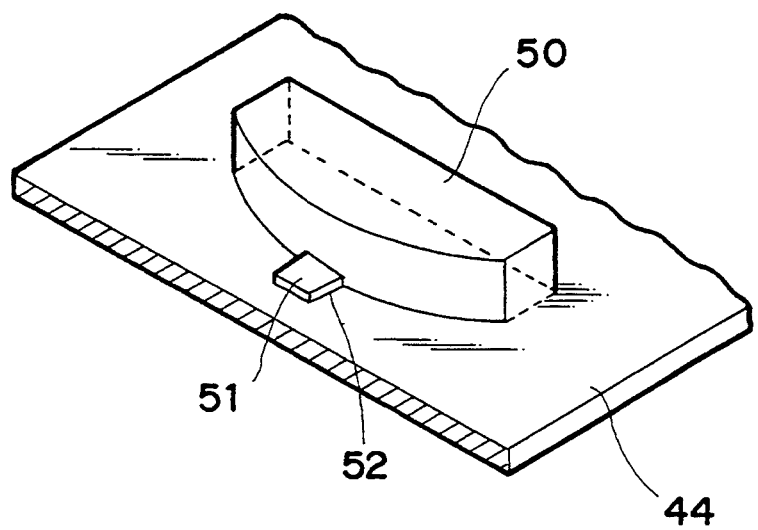

FIG. 15 shows a perspective view of a scanning lens in other embodiment of the present invention. Unlike the above embodiments, a bonding plane 52 of a synthetic resin lens 50 is a bottom surface of a thin projection 51 which projects at a center bottom of the synthetic resin lens 50. The synthetic resin lens 50 is positioned in the manner described in the above embodiment and the ultraviolet ray cured adhesive is applied to the bottom surface of the thin projection 51. The projection 51 for bonding is integrally molded to project longitudinally of the lens in the vicinity of the optical axis.

In the present embodiment, the synthetic resin lens 50 is secured to the fixed base 44 by the narrow area bonding by the bonding area 52, and no distortion is created. An affect of the distortion to the effective lens area is suppressed by increasing the distance between the thin projection 51 and the effective lens area. Because the projection 51 is thin, the transmission of the ultraviolet ray is high and the bonding time can be shortened.

In the present embodiment, the thickness of the projection 51 of the synthetic resin lens 50 is preferably 1 mm~5 mm. The length of the projection is longer than 1 mm to facilitate the mount operation, and it is preferably longer than 3 mm to improve the workability of the securing operation.

Since only one thin projection is used, the compact synthetic resin lens is attained.

What is claimed is:

1. A synthetic resin lens for an optical system of a scanning optical system comprising:
   a synthetic resin lens having a mount area which includes a light guide hole, said mount area for adhesively mounting said synthetic resin lens, and said light guide hole for guiding an adhesive curing light to adhesive at the mount area, wherein said light guide hole does not extend through said mount area.

2. A synthetic resin lens according to claim 1 wherein a bottom of the light guide hole is of lens shape.

3. A synthetic resin lens according to claim 1 wherein said light guide hole is adapted to receive an ultraviolet adhesive curing light.

4. A synthetic resin lens according to claim 1 wherein the light guide hole is formed at an end of the lens.

5. A synthetic resin lens according to claim 1 wherein a plurality of light guide holes are formed in the lens.

6. A synthetic resin lens according to claim 1 wherein the lens is a toric lens.

7. A scanning optical system comprising:
   a light source;
   a deflector for deflecting a light beam from said light source;
   a synthetic resin lens for directing the light beam deflected by said deflector to a predetermined direction; and
   a base for mounting said synthetic resin lens;
   said synthetic resin lens having a mount area which includes a light guide hole, said mount area for adhesively mounting said synthetic resin lens to said base and said light guide hole for guiding an adhesive curing light to adhesive in the amount area, wherein said light guide hole does not extend through said mount area.

8. A scanning optical system according to claim 7 wherein a bottom of the light guide hole is of lens shape.

9. A scanning optical system according to claim 7 wherein said light guide hole is adapted to receive an ultraviolet adhesive curing light.

10. A scanning optical system according to claim 7 wherein the light guide hole is formed at an end of the lens.

11. A scanning optical system according to claim 7 wherein a plurality of light guide holes are formed in the lens.

12. A scanning optical system according to claim 7 wherein the lens is a toric lens.

13. A recording apparatus comprising:
    a light source;
    a deflector for deflecting a light beam from the light source;
    a recording medium;
    a synthetic resin lens for directing the light beam deflected by the deflector to the recording medium; and
    a base for mounting the synthetic resin lens thereon;
    said synthetic resin lens having a mount area which includes at least one light guide hole, said mount area for adhesively mounting said synthetic resin lens to said base, and said light guide hole for guiding an adhesive curing light to adhesive at the mount area, wherein said light guide hole does not extend through said mount area.

14. A recording apparatus according to claim 13, wherein a bottom of the at least one light guide hole is of lens shape.

15. A recording apparatus according to claim 13, wherein said at least one light guide hole is adapted to receive an ultraviolet adhesive curing light.

16. A recording apparatus according to claim 13, wherein the at least one light guide hole is formed at an end of the lens.

17. A recording apparatus according to claim 13, wherein a plurality of the light guide holes are formed in the lens.

18. A recording apparatus according to claim 13, wherein the lens is a toric lens.

* * * * *